United States Patent [19]
Blomgren, Jr.

[11] Patent Number: 5,172,741
[45] Date of Patent: Dec. 22, 1992

[54] TIRE BEAD SEATER

[75] Inventor: Oscar C. Blomgren, Jr., Lake Forest, Ill.

[73] Assignee: Tuxco Corporation, Gurnee, Ill.

[21] Appl. No.: 731,123

[22] Filed: Jul. 15, 1991

[51] Int. Cl.⁵ .............................................. B60C 25/12
[52] U.S. Cl. .................................................. 151/1.21
[58] Field of Search ...................... 157/1, 1.21; 254/93

[56] References Cited

U.S. PATENT DOCUMENTS

| | | | |
|---|---|---|---|
| 3,578,059 | 5/1971 | Uhen .................. | 157/1.21 |
| 3,710,837 | 1/1973 | Blomgren, Sr. et al. .......... | 157/1.21 |
| 3,970,342 | 7/1976 | Cotton ............................ | 157/1.21 X |

Primary Examiner—James G. Smith
Attorney, Agent, or Firm—Lloyd L. Zickert

[57] ABSTRACT

An improved tire bead seater for use in constricting tubeless bias ply tires of various sizes and plies to force the beads of the tires into a proper seated and sealed position with the wheel rims, including a frame within which a hydraulic ram is mounted, a plurality of different size straps or belts for constricting different size and ply tires, the straps being interchangeable and adjustably connected to the frame, the bead seater being of an improved construction requiring a minimum amount of parts and assembly time, thereby providing a single tire bead seater for handling tires of varying plies and sizes.

11 Claims, 4 Drawing Sheets

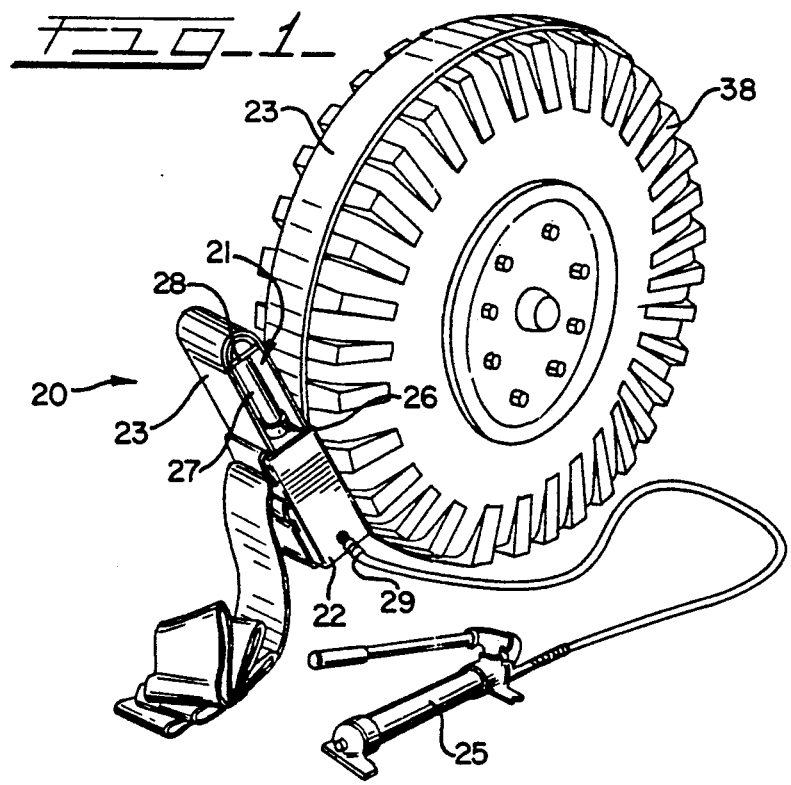
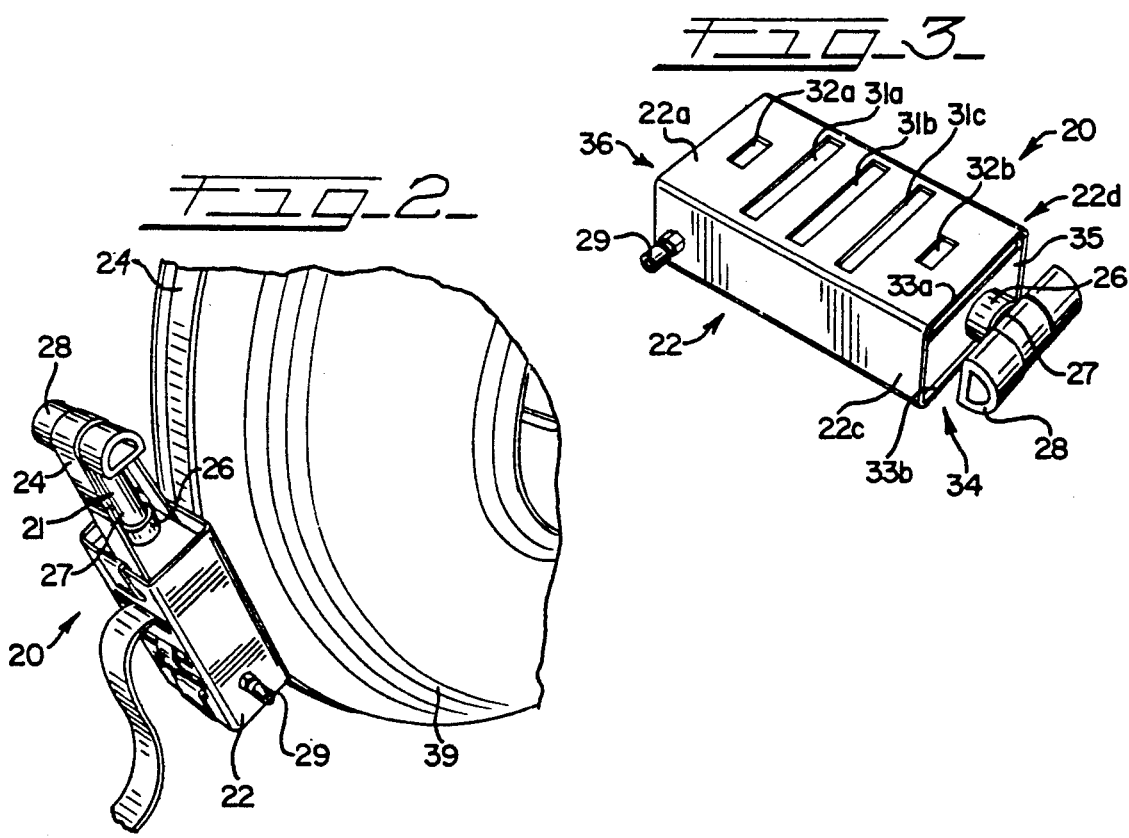

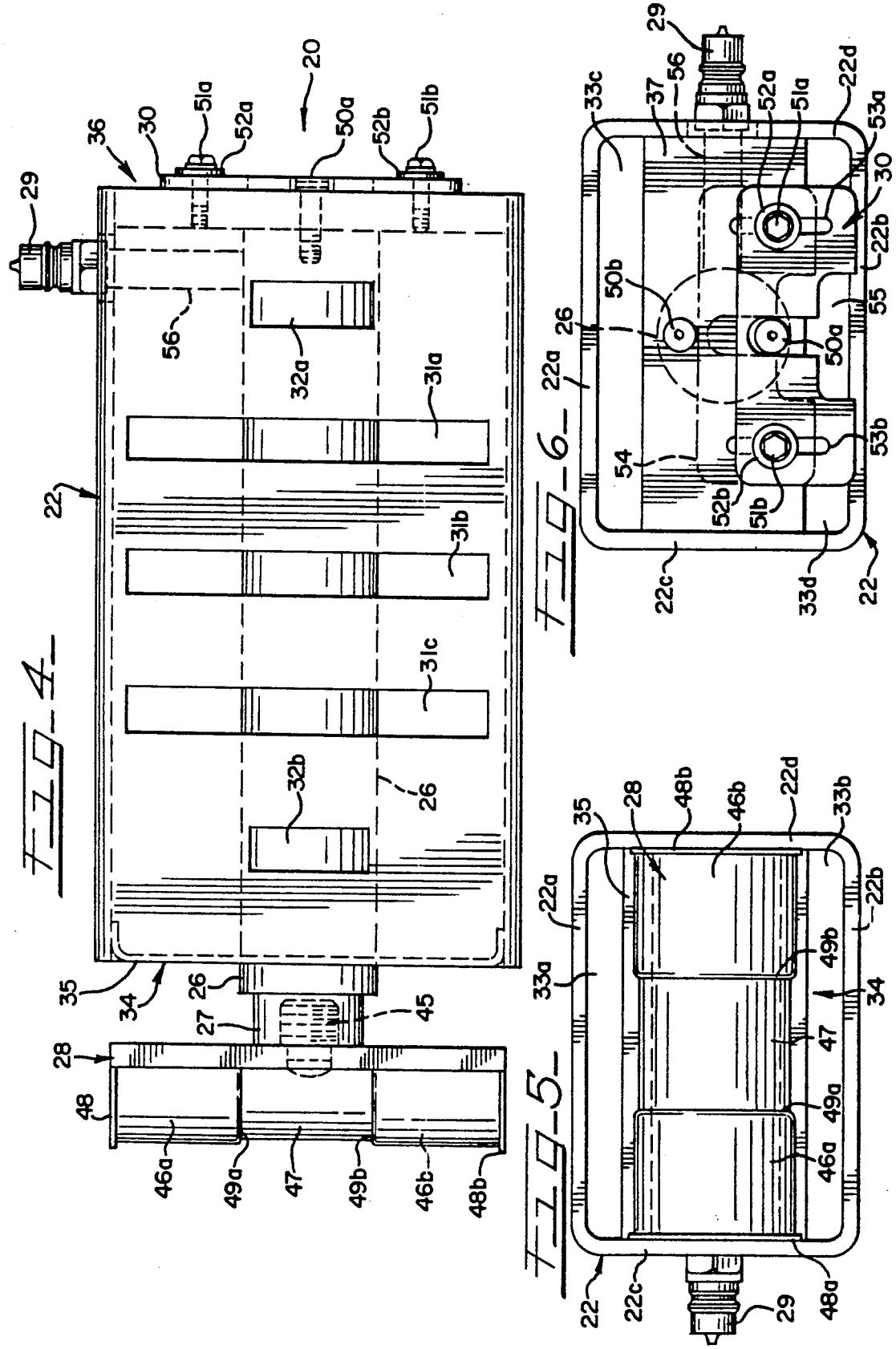

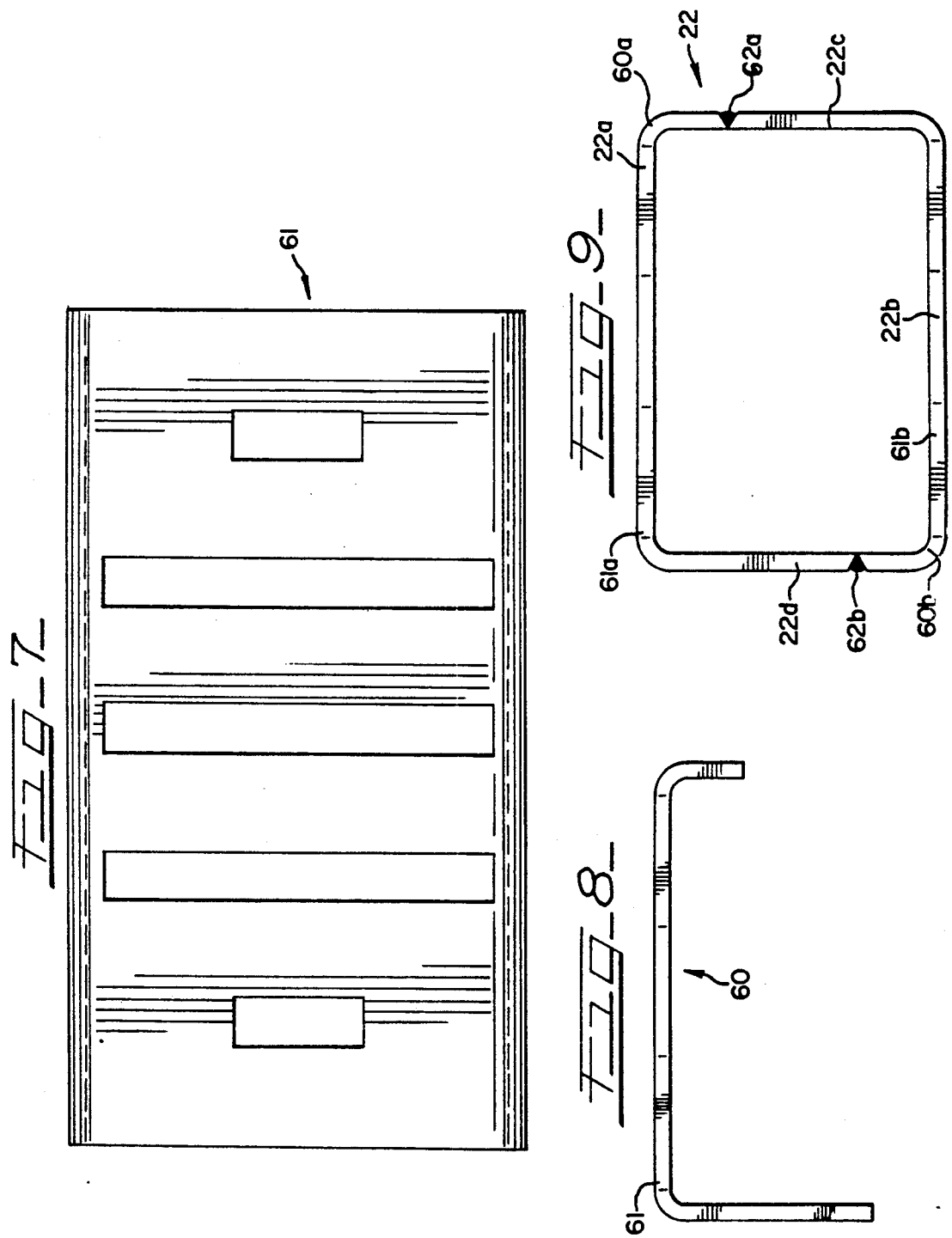

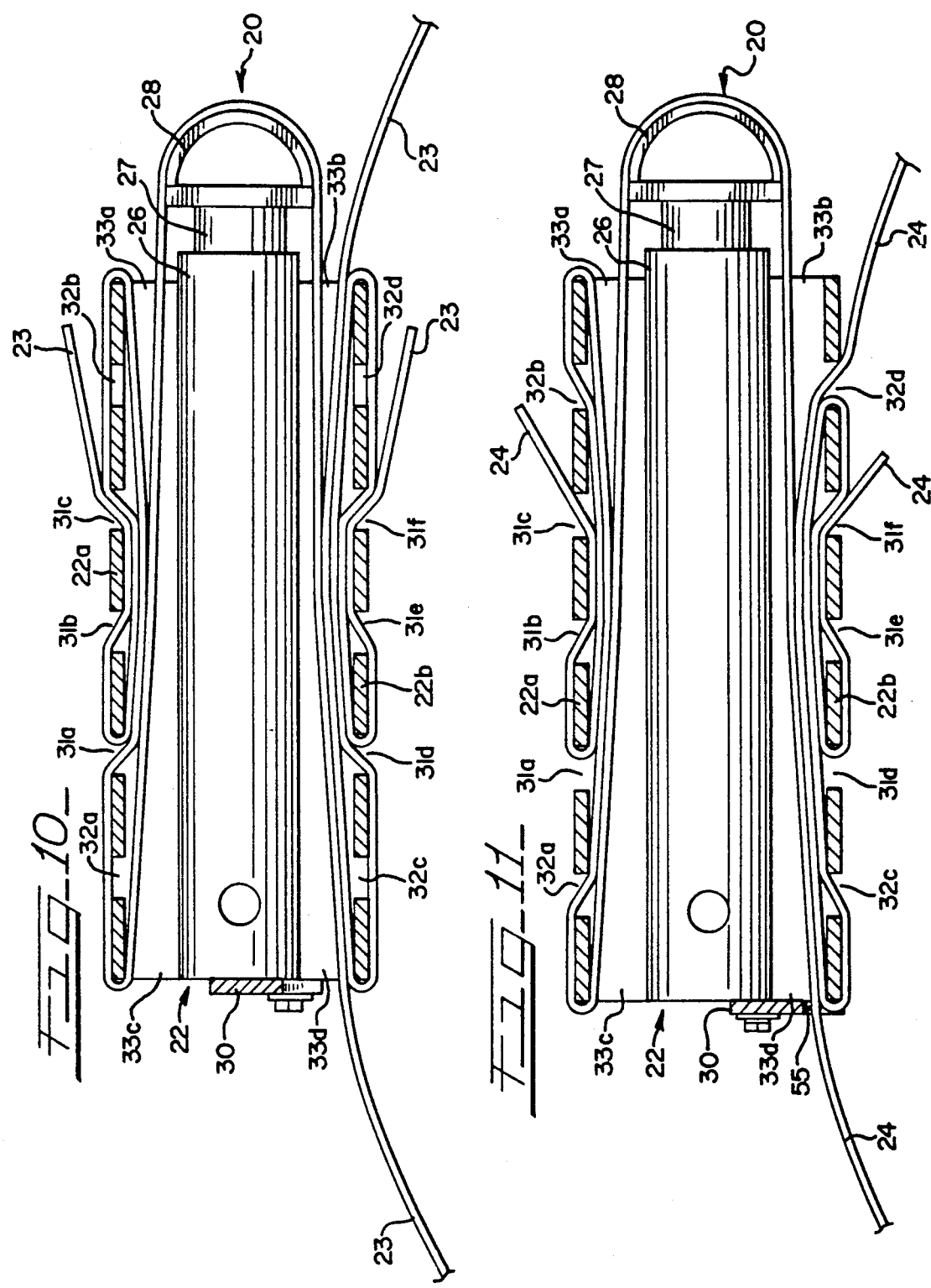

TIRE BEAD SEATER

This invention relates in general to an improved device for mounting tubeless bias ply tires on wheels, and more particularly to a device adaptable for different size straps or belts used for constricting a variety of different size and ply tires to spread the tire beads into contact with the wheel rims in properly seated and sealed positions so the tire can be inflated, thereby providing a single less expensive device which can be used on a wider range of tubeless bias ply tires.

BACKGROUND OF THE INVENTION

Heretofore, it has been well known to provide tire constrictors for mounting large bias ply tires on large equipment or heavy machinery such as construction, military and aircraft tires. Such tires are frequently tubeless and, because of their large size, are extremely heavy and difficult to handle and particularly difficult to mount on a wheel and inflate. The construction of these tires renders them extremely stiff and relatively inflexible. Normally such tires are mountable on wheels having one fixed rim and one removable rim, wherein the removable rim is detached to allow the tire to be first placed on the wheel. The removable rim is then reattached. The general problem is that when the tire is first mounted on the wheel, the beads of the tire are not in contact with the wheel rims, and since the tire is tubeless, the tire cannot be inflated.

One tire constricting device for properly mounting a tire on a wheel includes a flexible strap or belt which is tightened around the circumference of a tire by a fluid powered ram which squeezes the tire along a central plane, thus spreading the beads. This type of mechanism heretofore known is disclosed in U.S. Pat. No. 3,710,837. Other heretofore known devices are described therein.

The mechanism disclosed in U.S. Pat. No. 3,710,837 involves a single flexible strap or belt that is attached at both ends to a box which contains a fluid powered ram for tightening the strap or belt about the tire and thus squeezing the tire along a central plane spreading the beads toward and into engagement with the wheel rims. While this device performs its intended function, it has several problems.

The first problem is that the box and ram can only be used with one width of strap or belt. However, the tubeless tires come in a variety of sizes and plys requiring straps or belts of differing widths. These tires may be as large as 9 feet in diameter and 3 feet in width and range from 2-30 ply construction. For mounting all tires of such varying size, ply, and construction, it is necessary to use wide belts on 2 to 12 ply tires to avoid distorting the casings and narrow belts on 14-30 ply tires. That means two separate conventional tire constrictors are required, one with a small, two-inch wide strap or belt, and one with a large, six-inch wide strap or belt. Accordingly, since two different constrictors are necessary to handle the wide range of tires, the overall expense is double.

The second problem is that the box and ram construction consists of approximately twenty-eight separate pieces of tubing, flat bar, and round bar in each unit, as well as approximately a dozen lock rings, nuts and bolts. The welding of these pieces requires 5 feet or more of MIG weld and a considerable amount of labor. Moreover, the assembly of these pieces also requires a considerable amount of cutting, grinding, and cleaning. This has made tire constrictors high labor input products and has increased their overall cost.

The third problem is that the box and ram construction is susceptible to corrosion in the field. This corrosion is due to the construction of the box which prohibits the painting of the entire unit, specifically inside the tubes which comprise the frame of the box. This corrosion leads to weakening of the device and reduces the useful life of the tire constrictor. This increases the overall maintenance expense to the user.

SUMMARY OF THE INVENTION

The present invention overcomes the above problems in providing a single tire bead seater or constrictor that is adaptable to two different size straps or belts which can be used on different size and ply tires, thereby eliminating the need for two tire constrictors and significantly reducing overall expense. Further, the present invention significantly reduces the total number of pieces, which significantly reduces the amount of assembly labor required, thereby reducing inventory requirements and associated manufacturing expenses.

The tire bead seater of the present invention includes a box-shaped frame within which a hydraulic ram is mounted. At one end of the frame, the piston of the hydraulic ram extends from the frame and is connected to a semi-tubular piston head. The piston is hydraulically extendable thereby capable of moving the piston head away from the frame. The frame has different size slots, which are cut by an automatic punch or a laser prior to construction, and which permit different size straps or belts to be attached to both sides of the frame by threading the straps or belts through the slots in a specified fashion. To use the bead seater, one of the straps or belts, depending on the construction of the tire, is attached to the side of the frame adjacent to the tread of the tire and is placed around the circumference of the tire. It is then placed through the frame, trained over the piston head, and attached to the opposite side of the frame with a snug fit around the circumference of the tire. In operation, the hydraulic ram is protracted, causing the take up of the strap or belt and thereby constricting the circumference of the tire. This causes the beads of the tire to spread out into a proper seated and sealed position, thereby allowing the tire to retain air when filled.

It is therefore an object of the present invention to provide a new and improved single tire bead seater for mounting a variety of different size and ply tubeless tires on wheels, thereby eliminating the need to have different size tire constrictors with different size straps or belts and thereby decreasing the overall costs.

Another object of the present invention is to provide a single tire bead seater which is usable with two different size straps or belts for a variety of sizes and plies of tubeless tires, thereby eliminating the need for two tire constrictors.

A further object of the present invention is to provide a tire bead seater which is manufactured from a significantly reduced number of pieces, thereby reducing inventory requirements, the amount of welding, labor hours required for assembly, and thus reducing overall costs.

A still further object of the present invention is to provide a tire bead seater design which allows the strap or belt slots to be cut with a laser or automatic punch prior to construction, thereby reducing manufacturing hours and overall costs.

A yet further object of the present invention is to provide a tire bead seater design that accepts painting better since it has significantly less pieces and more flat surfaces which ultimately prevents corrosion in the field, thereby increasing the lifetime of the tire bead seater and decreasing overall costs.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a perspective view of the tire and tire bead seater of the invention, and illustrating the tire bead seater with the relatively wide strap or belt attached for constricting the tire to spread the tire beads into contact with the wheel rims;

FIG. 2 is a perspective view of a partial tire and tire bead seater, and illustrating the bead seater of the invention with the relatively narrow strap or belt attached for constricting the tire to spread the tire beads into contact with the wheel rims;

FIG. 3 is an enlarged perspective view of the tire bead seater removed from a tire, and illustrating the tire bead seater without either the wide or narrow straps or belts attached;

FIG. 4 is a top plan view of the tire bead seater;

FIG. 5 is an end view of the piston head and top end of the tire bead seater;

FIG. 6 is an end view of the side opposite the piston head or the base end of the tire bead seater, and illustrating the construction of the movable guiding bracket;

FIG. 7 is a top plan view of the frame piece of the tire bead seater;

FIG. 8 is cross section of the elevation of the top frame piece the tire bead seater;

FIG. 9 is cross-section of the top and bottom frame pieces, and illustrating the assembly of the two pieces;

FIG. 10 is a schematic cross-sectional side view of the tire bead seater, and illustrating the threading of the wide strap or belt; and FIG. 11 is a schematic cross-sectional side view of the tire bead seater, and illustrating the threading of the narrow strap or belt.

DESCRIPTION OF THE INVENTION

The tire bead seater of the present invention applies force evenly to the entire tread circumference of a tire by having either a relatively wide or relatively narrow flexible strap or belt in engagement with nearly all of the tread circumference during operation. While it should be appreciated that the sizes of the wide and narrow straps or belts can vary, in the preferred embodiment, the wide strap or belt has about a six (6) inch width and the narrow strap or belt has about a two (2) inch width. The use of the six-inch or two-inch strap or belt depends on the size and ply of the tire. When the bead seater of the present invention is in operation, force is applied tangentially to the tire casing circumference, such that the force vectors produced in operating the ram are in substantially the same axis as the ram, thereby eliminating any side deflection of the piston and giving great mechanical integrity to the device. The ram is operated by a suitable hydraulic pump, manual or otherwise. The six-inch and two-inch straps or belts are interchangeable such that either strap or belt can be adjustably connected to the ram so as to facilitate use of the constrictor on different size and ply tires. A pressure relief valve may be provided on the bead seater or on the hydraulic pump operating the ram to prevent exceeding the strap or belt capacity during operation of the tire bead seater. For simplicity the strap or belt will be referred to as a strap hereinafter.

Referring now to the drawings, and particularly to the embodiment disclosed in FIGS. 1, 2, and 3, the tire bead seater 20 of the present invention includes a hydraulic ram 21 mounted in a box shaped frame 22, a relatively wide flexible strap 23, as illustrated in FIG. 1, and a relatively narrow flexible strap 24, as illustrated in FIG. 2. A manually operable hydraulic pump 25 is illustrated for actuating the ram of the tire bead seater. The hydraulic ram 21 is constructed from a cylinder 26, a piston 27, and a piston head 28.

Referring to FIG. 3, the bead seater 20 is illustrated without the wide strap 23 or the narrow strap 24 for the purpose of simplicity. The frame 22 is constructed having a top wall 22a and a bottom wall 22b which are parallel, spaced apart, and opposing, and two side walls 22c and 22d which are parallel, spaced apart, and opposing. The frame 22 also has a movable guiding bracket 30 and several slots. These slots serve two purposes. First, they are used to attach the straps 22 and 23 to both the top and bottom walls of the frame by threading the straps through the slots. Second, the slots which are wide help to guide the wide strap 22 and the slots which are narrow help to guide the narrow strap 23, thereby preventing sideward movement of the straps during operation of the tire bead seater 20. There are six wide strap slots 31a, 31b, 31c, 31d, 31e, and 31f and four narrow strap slots 32a, 32b, 32c, and 32d. The wide slots 31a, 31b, and 31c are located on the top wall 22a of the frame which is opposite the bottom wall 22b where slots 31d, 31e, and 31f are located. All of these slots run substantially parallel to the piston head 28. The narrow slots 32a and 32b are located on the top wall 22a of the frame where slots 31a, 31b, and 31c are located. The narrow slots 32c and 32d are located on the opposite or bottom wall 22b of the frame where slots 31d, 31e, and 31f are located. All of the narrow slots run substantially parallel to piston head 28 and are located on each side of the wide strap slots, such that the wide slots 31a, 31b, and 31c are between the narrow slots 32a and 32b on the top wall, and such that the wide slots 31d, 31e, and 31f are between the narrow slots 32c and 32d on the bottom wall. All of these slots are approximately one inch in width; however, this could vary. It should be appreciated that a bead seater could be developed which has more than two different size slots if more than two different size straps were necessary.

The frame 22 also has four end openings 33a, 33b, 33c, 33d through which the straps will extend. As illustrated in FIG. 3, openings 33a and 33b are located on the piston head end 34 of the frame and on opposite sides of a piston head end plate 35 which s welded to the frame as discussed below. These openings also run substantially parallel to the piston head 28. Openings 33c and 33d are located on the opposite side of piston head end 34 of the frame 22 which is on the base end 36 of the bead seater 20. These openings are on opposite sides of a base end plate 37, which is welded to the frame as described below, and run substantially parallel to piston head 28.

FIG. 3 also illustrates that piston head 28 is attached to the top of piston 27, as described below: Piston head 28 has a semi-tubular shape with the flat end attached to the piston 27 and the rounded end facing away from the frame 22. Piston head 28 is used to provide equal force to either the wide or narrow strap when the piston 27 is hydraulically extended from the cylinder 26, as shown in FIGS. 1 and 2. Piston head 28 also guides both the wide and narrow straps, as discussed below.

Referring to FIG. 1, the wide strap 23 is constructed from a suitable flexible material, such as a steel mesh or a plastic material. More particularly, the strap may be made of nylon, dacron, polypropylene or a suitable polyester. The strap is placed around the circumference of the tire 38 and is secured to the frame 22 so that the protraction or extension of the piston 27 will cause take-up of the strap 23. The design provides take-up equal to two times the stroke of the piston 27. One end of strap 23 is adjustably and disattachably connected to the bottom wall 22b of the frame 22 that is adjacent to the tread, as described below and illustrated in FIG. 10, and is positioned on the tire to constrict the tire circumference. The other end of the strap 23 is connected to the top wall 22a of the frame 22, as described below and illustrated in FIG. 10, and arranged in connection with the piston head 28 and the frame 22 to enable take-up of the strap 23 and thereby constricting the tire circumference.

Referring to FIG. 2, the narrow strap 24 is generally constructed from the same material as the wide strap. It is placed around the circumference of the tire 39 and is secured to the frame 22 so that the protraction or extension of the piston 27 will cause take-up of the strap 24. The attachment of strap 2 is generally similar to strap 23 except in the method of threading which is somewhat different, as described below and as illustrated in FIG. 11. It is important to note that the entire bead seater 20 can be flipped around for the wide strap 24 because the top wall 22a and the bottom wall 22b are substantially identical. For this alternative method of use, the bottom wall 22b of the frame 22 adjacent to the tread of the tire for the narrow strap will face away from the tire, and the top wall 22a will be adjacent to the tire tread.

The hydraulic pump 25 in FIG. 1 is of a conventional manually operated type. However, a power driven hydraulic pump may be used. A quick-disconnect hydraulic coupling member 29 is mounted on side wall 22c of the frame 22 for attaching a mating coupling on a line of the manual hydraulic pump 25.

Referring to FIGS. 4 and 5, the piston head 28 is secured to the piston 27 by a stud 45. This stud is connected to the piston head and threadedly fastened to the piston as illustrated by the dotted line in FIG. 4. The piston head 28 has three surfaces, two spaced apart wide strap surfaces 46a and 46b on one level, and one narrow strap surface 47 on a different level which is recessed from the level of the wide strap surfaces. When the wide strap 23 is used, it contacts and folds around surfaces 46a and 46b. There are two wide strap guides 48a and 48b in the form of lips at the outer edges of the surfaces 46a and 45b which guide the wide strap. These strap guides prevent the wide strap from shifting side to side or laterally, and maintain the wide strap centered on the piston head, thereby assuring that the wide strap and the entire tire bead seater remain substantially parallel and in the center of the tread of the tire. When the narrow strap 24 is used, it contacts and folds around surface 47 which is at a depressed, indented, or lower point than surfaces 46a and 46b. Strap 24 lies between the narrow strap guides 49a and 49b which are merely the ends of the wide surface areas 46a and 46b, respectively. The narrow strap guides 49a and 49b perform the same function as the wide strap guides by maintaining the narrow strap centered on the piston head and preventing the narrow strap from shifting side to side, thereby assuring that the strap and the tire bead seater remain parallel and in the center of the tread of the tire. The indented or depressed surface 47 for the narrow strap is deep enough to keep the narrow strap in place, but not so deep that it damages or causes unusual deformation of the wide strap when it is used.

FIGS. 4 and 5 also illustrate the mounting of the piston head end plate 35 on the frame 22. On the piston head end 34 of the frame, the piston head end plate is secured by welding or other suitable means to sides 22c and 22d, the sides of the frame which do not have slots. The piston head end plate 35, when mounted on the frame does not completely close the piston head end of the frame, but rather leaves openings 33a and 33b. The piston head end plate 35 also has a round hole in its center through which the cylinder 26 protrudes from the frame 22. This hole has a circumference which is slightly larger than the circumference of the cylinder 26, and the plate 35 serves to position the piston end of the cylinder in centered relation to the frame. Thus, the cylinder can be disattached, as described below, and can be removed from the frame to be repaired or replaced.

Referring to FIGS. 4 and 6, the cylinder 26 extends through the hole in the plate 35 and through the rest of the frame to the base end 36. Cylinder 26 is attached to the base end plate 37 by two bolts 50a and 50b which extend through the base end plate and into the bottom end of the cylinder 26. This fastens the cylinder to the frame. This also allows the cylinder to be unfastened and removed from the frame so that it can be repaired or replaced, if necessary. The base end plate 37 to which the cylinder is mounted is welded or attached by other suitable means to sides 22c and 22d of the frame 22. Similar to the piston head end plate, two openings 33c and 33d are left when the base end plate is mounted on the frame on the base end 36.

FIGS. 4 and 6 also illustrate the guiding bracket 30. The guiding bracket is movably fastened to the base end plate 37 on the base end 36. The guiding bracket is fastened to the frame 22 by two bolts 51a and 51b. Washers 52a and 52b are provided on the bolts 51a and 51b, respectively, to coact with the bracket when it is moved. These bolts are tightened to selectively secure the guiding bracket in either a strap engageable or nonengageable position. The bolts are loosened to move the guiding bracket from either position and thereafter tightened to lock the bracket in position. There are two oval shaped slots 53a and 53b in the guiding bracket through which the bolts 51a and 51b extend to fasten the guiding bracket to the base end plate 37 and thus to the frame 22. The washers 52a and 52b have a diameter wider than the width of the oval slots such that they assist in fastening the guiding bracket to the base end plate. These oval slots 53a and 53b are oval in shape to permit the vertical movement of the guiding bracket when the bolts are loosened. The length of the oval slots regulate the movement of the guiding bracket such that it does not extend beyond the frame when in use, nor does it impede the movement of the wide strap through slot 33d when not being used. FIG. 6 clearly illustrates the position of the guiding bracket when it is in a strap-engageable position as well as illustrating the position of the guiding bracket when it is in a non-engageable strap position by dotted line 54. It should be appreciated the guiding bracket 30 restricts opening 33c and is used to center and guide the narrow strap 24 during take-up by the ram. The guiding bracket has an aperture 55 which is just wide enough for the narrow strap to pass through when the narrow strap is used. Thus, the guiding bracket centers the narrow strap by reducing the opening 33c in the frame to slightly greater than the width of the narrow strap and thereby controls the side-to-side movement of the narrow strap 24.

FIGS. 4 and 6 further illustrate by dotted line a hydraulic pipe 56 which extends between the quick-disconnect hydraulic coupling member 29 and the cylinder 26. This is simply a standard threaded hydraulic pipe which permits the hydraulic fluid to enter and exit the cylinder 26. This pipe can be removed to facilitate removal of the cylinder from the box.

FIGS. 7, 8, and 9 illustrate the construction of the frame 22 without the piston head end plate 35 or the base end plate 37 for simplicity. Frame 22 is constructed from two identical substantially U-shaped frame pieces 60a and 60b. Each piece includes a substantially flat wall and upstanding legs, one of which is longer than the other. It should be appreciated that these pieces do not have to take on a U-shape as shown with one leg longer than the other; they could be formed from L-shaped pieces or pieces that are U-shaped with legs of equal length. However, the particular shape shown is preferred, as it facilitates welding the pieces together and providing opposite flat walls once the welds are ground flat to permit the easy application of screen printed instructions. Prior to construction each frame piece has the wide and narrow slots cut on surfaces 61a and 61b, as illustrated in FIG. 7. A laser is preferably used to cut the slots in surfaces 61a and 61b which significantly reduces the amount of manufacturing time, labor and distortion caused by punching. These slots are cut in both frame pieces 60a and 60b such that when they are welded together, the slots are identical on both sides of the frame 22. In construction, the frame pieces 60a and 60b are placed in abutting relation to each other, as illustrated in FIG. 9, and are welded together throughout the length of the frame at weld points 62a and 62b. Each weld is ground on a wet belt grinder to provide relatively smooth side walls. This construction has numerous advantages. First, this significantly reduces the number of parts required to construct the body. Second the amount of welding is significantly reduced. Third, the instructions can be screen-printed on the welded sides of the body, thereby eliminating the need for additional instruction plates. Fourth, prior to the welding, the strap slots are already cut as described above. This significantly reduces manufacturing costs in terms of time and parts and thus overall costs. It should also be appreciated that when frame pieces 60a and 60b are welded together, they form top and bottom walls 22a and 22b, but more importantly, they form sides 22c and 22d.

Referring to FIG. 10, the wide strap 23 is attached to the frame 22 by threading the end of the strap into the frame through opening 33b and out of the frame through opening 33d. The strap is then folded around the frame, threaded upwardly into the frame through slot 31d and threaded out of the frame through opening 33b. The strap is then folded around the frame, threaded upwardly into the frame through slot 31f, threaded downwardly out of the frame through slot 31d, folded around the frame, threaded upwardly into the frame through slot 31e and threaded downwardly out of the frame through slot 31f. This firmly anchors the wide strap 23 to the bottom wall 22b of the frame which is adjacent to the tread of the tire. Several things should be appreciated regarding this connection. First, this strap may be adjustably fixed to the frame at this wall. Second, slots 32c and 32d are not used when the wide strap is attached to the frame because the wide strap cannot fit through the narrow slots. Third, this order of threading is the preferred method, but other threading arrangements are possible including varying the number of slots and the size of the slots. Fourth, and finally, the guiding bracket 30 is placed in a non-engageable strap position and serves no function relative to the wide strap.

The other end of strap 23, after encircling the center of the circumference of the tire, is then threaded into frame through opening 33d and out of the frame through opening 33b. It is then trained or folded over the retracted piston head 28 and between guides 48a and 48b. It should be appreciated that the strap 23 rubs against itself inside the length of the frame which avoids friction from the strap rubbing against the frame or the frame slots, thereby reducing stress and wear on the strap. The strap 23 is then connected to the top wall 22a of the frame by threading the strap into the frame through opening 33a and out of the frame through opening 33c. It is then folded around the frame, threaded downwardly into the frame through slot 31a, threaded out of the frame through opening 33a, folded around the frame, threaded downwardly into the frame through slot 31c, threaded upwardly out of the frame through slot 31a, folded around the frame, threaded downwardly into the frame through slot 31b, and finally threaded upwardly out of the frame through slot 31c. As such, slots 32a and 32b are not used in the threading of the wide strap.

The slack in the strap is taken up when the strap is such that when initially positioning the ram on the circumference of the tire thread, so that with the piston 27 fully retracted in the cylinder 26, the strap is snugly fitted and adjusted to the tread circumference. Thereafter, extension or protraction of the piston 27 causes constricting of the tire which spreads the side walls and forces the beads into sealing relation with the wheel rims.

Referring to FIG. 11, the narrow strap 24 is connected to the frame 22 by threading one end of the strap upwardly into the frame through slot 32d, out of the frame through opening 33d and through the aperture 55 in guiding bracket 30. It should be appreciated that by first placing the narrow strap through the narrow slot 32d, the side-to-side or lateral movement of the strap is limited. It should also be noted that for the narrow strap, the guiding bracket 30 is placed in a strap-engageable position and thus controls the side-to-side movement of the narrow strap. The strap 24 is then folded around the frame, threaded upwardly into the frame through slot 32c, threaded downwardly out of the frame through slot 32d, folded around the frame, threaded upwardly into the frame through slot 31f, threaded downwardly out of the frame through slot 31d, folded around the frame, threaded upwardly into the frame through slot 31e, and finally threaded downwardly out of the frame through slot 31f. This firmly anchors strap 24 to the bottom wall 22b of the frame which is adjacent to the tire tread. It should be appreciated that the strap may be adjustably fixed to the frame at this wall. It should also be noted that the narrow slots 32c and 32d, which prevent the side-to-side movement of the narrow strap, as well as the wide slots 31d, 31e and 31f, are used in threading the narrow strap.

The other end of the strap 24, after encircling the center of the circumference of the tire, is threaded into the frame through the aperture 55 of the guiding bracket 30 and opening 33d and out of the frame through opening 33b. It should be noted that the guiding bracket also controls the side-to-side movement of this end of the narrow strap. The strap 24 is then trained or folded over the piston head 28 and between guides 49a and 49b. It is then connected to the top wall 22a of the frame which is opposite the tire tread by threading the strap into the frame through opening 33a and out of the frame through opening 33c. It is then folded around the frame, threaded downwardly into the frame through slot 32a, threaded out of the frame through opening 33a, folded around the frame, threaded downwardly into the frame through slot 32b, threaded upwardly out of frame through slot 31a, folded around the frame, threaded downwardly into the frame through slot 31b, and finally threaded upwardly out of frame through slot 31c. Here, it should also be appreciated that narrow slots 32a and 32b, which prevent the side-to-side movement of the narrow strap, as well as wide slots 31a, 31b and 31c, are used to in threading the narrow strap 24.

Strap slack is taken up when the circumferential length of the strap around the tire tread is set when initially positioning the ram on the circumference of the tire tread, so that with the piston fully retracted, the strap is snugly fitted and adjusted to the tread circumference. Thereafter, extension or protraction of the piston 27 causes decreasing the circumferential length of the strap, thereby constricting of the tire which spreads the side walls of the tire and drive the beads into sealing engagement with the wheel rims.

It will be understood that modifications and variations may be effected without departing from the scope of the novel concepts of the present invention, but it is understood that this application is to be limited only by the scope of the appended claims.

What is claimed is:

1. A tire bead seater for mounting a tubeless tire on a vehicle wheel to constrict said tire, said tire having beads and said wheel having rims against which said beads are adapted to seal, said bead seater adapted to force said beads of said tire to spread and contact said wheel rims in a proper seated and sealed position, said tire bead seater comprising, a frame adapted to extend substantially tangential to said tire, a hydraulic ram mounted on the frame, a piston rod extendable therefrom, a piston head on the piston rod, a plurality of different size straps of flexible material, said frame having a plurality of different size slots for receiving said plurality of different size straps, said piston head having the ability to guide any one of said plurality of different size straps, each of said plurality of different size straps being attachable to said frame such that when any one of said plurality of different size straps is used, it is in tire-circumventing relation with said tire having one end attached to said frame on the side adjacent said tire and the other end running through said frame and first trained over said piston head and then attached to the side of said frame opposite the side adjacent to said tire, and means for operating said ram, whereby extension of said piston rod/piston head shortens the circumferential length of said strap to compress said tire and cause expansion of said beads for engaging said wheel rims.

2. A tire bead seater as defined in claim 1, wherein said frame is substantially of rectangular box like shape having a plurality of different size slots for receiving said plurality of different size straps to attach the straps to the frame.

3. A tire bead seater as defined in claim 2, wherein said frame includes two identical pieces welded together.

4. A tire bead seater as defined in claim 2, wherein said frame includes two identical substantially U-shaped pieces with one leg longer than the other and welded together.

5. A tire bead seater as defined in claim 2, wherein said frame includes two identical substantially L-shaped pieces welded together.

6. A tire bead seater as defined in claim 1, wherein said piston head is substantially of semi-tubular shape having a plurality of different level surface areas capable of guiding any one of said plurality of different size straps during movement of said strap over the piston head.

7. A tire bead seater as defined in claim 1, wherein there are two different size straps, said frame accepting said two different size straps, and said piston head having means to guide said two different size straps.

8. A tire bead seater as defined in claim 1, wherein the frame further includes a means for guiding the plurality of different size straps on the end of the frame opposite the piston head.

9. A tire bead seater as defined in claim 8, wherein said means for guiding the plurality of different size straps includes an adjustable guiding bracket selectively movable between guiding and non-guiding positions.

10. A tire bead seater for mounting a tubeless tire on a vehicle wheel to constrict said tire, said tire having beads and said wheel having rims against which said beads are adapted to seal, said bead seater adapted to force said beads of said tire to spread and contact said wheel rims in a proper seated and sealed position, said tire bead seater comprising, a frame adapted to extend substantially tangential to said tire, a hydraulic ram carried by the frame, a piston rod extendable therefrom, a piston head on the free end of the piston rod, a wide strap, a narrow strap, said frame having slots for accepting said wide strap and narrower slots for accepting said narrow strap, said piston head having the ability to guide said wide strap or said narrow strap, either strap being attachable to said frame such that when it is used, it is in tire-circumventing relation with said tire having one end attached to said frame on the side adjacent said tire and the other end running through said frame and first trained over said piston head and then attached to the side if said frame opposite the side adjacent to said tire, and a means for operating the ram, whereby extension of said piston rod/piston head shortens the circumferential length of the strap to compress the tire and cause expansion of the beads for engaging the wheel rims.

11. A tire bead seater for mounting a bias ply tubeless tire on a vehicle wheel, said bead seater adapted to force said tire in a proper seated and sealed position, said tire bead seater comprising, a frame, a hydraulic ram on the frame, a piston rod extendable therefrom, a piston head on the piston rod, a plurality of different size belts of flexible material, said frame having a plurality of different size slots for said belts, each of said plurality of different size belts being alternatively attachable to said frame by being threaded through the slots, one end of said attached belt being attached to said frame, the other end of said belt encircling said tire and being trained over the piston head and attached to the other side of said frame such that when said ram is extended said belt constricts the circumference of said tire causing it to seat and seal properly, a means for operating said ram.

* * * * *

UNITED STATES PATENT AND TRADEMARK OFFICE
CERTIFICATE OF CORRECTION

PATENT NO. : 5,172,741

DATED : December 22, 1992

INVENTOR(S) : Oscar C. Blomgren, Jr.

It is certified that error appears in the above-identified patent and that said Letters Patent is hereby corrected as shown below:

```
Col. 3, line 39, after "piece" insert --of--;
Col. 4, line 60, after "which" change "s" to --is--;
Col. 5, line 34, after "strap" change "2" to --24--;
Col. 10, line 58, change "if" to --of--; and
Col. 12, line 5, change "a" to --and--.
```

Signed and Sealed this

Twelfth Day of October, 1993

Attest:

BRUCE LEHMAN

*Attesting Officer*

*Commissioner of Patents and Trademarks*